(12) United States Patent
Chuang

(10) Patent No.: US 7,207,225 B2
(45) Date of Patent: Apr. 24, 2007

(54) PIPING AND PRESSURE-MEASURING APPARATUS

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 33 days.

(21) Appl. No.: 10/907,725

(22) Filed: Apr. 13, 2005

(65) Prior Publication Data

US 2006/0230836 A1    Oct. 19, 2006

(51) Int. Cl.
*G01L 7/02* (2006.01)
(52) U.S. Cl. ...................... 73/730
(58) Field of Classification Search .......... 73/700, 73/146, 730; 152/415
See application file for complete search history.

(56) References Cited

U.S. PATENT DOCUMENTS

| | | | | |
|---|---|---|---|---|
| 5,307,846 A | * | 5/1994 | Heinemann | 141/1 |
| 5,560,792 A | * | 10/1996 | Anthony | 152/415 |
| 5,807,445 A | * | 9/1998 | Hoffmann | 152/415 |
| 6,772,812 B1 | * | 8/2004 | Hamilton | 152/415 |
| 6,880,598 B2 | * | 4/2005 | Haunhorst et al. | 152/415 |

OTHER PUBLICATIONS

Taiwan Patent Publication No. 391519, May 21, 2000, 4 pages.

* cited by examiner

*Primary Examiner*—Andre Allen
(74) *Attorney, Agent, or Firm*—Alan D. Kamrath; Nikolai & Mersereau, P.A.

(57) ABSTRACT

A piping and pressure-measuring apparatus includes a pipe defining a first chamber, a second chamber and a third chamber between the first and second chambers. A first connector includes a section put in the first chamber and an opposite section for connection with a pump. A check valve is installed in the first connector. A second connector includes a first element put in the second chamber and a second element connected with the first element for connection with an inflatable object. A pressure gauge is connected with the third chamber.

18 Claims, 12 Drawing Sheets

PIPING AND PRESSURE-MEASURING APPARATUS

BACKGROUND OF INVENTION

1. Field of Invention

The present invention relates to a pressure gauge and, more particularly, to a piping and pressure-measuring apparatus for use with pumps.

2. Related Prior Art

As taught in Taiwanese Patent Publication No. 391519 issued to the present inventor, a pressure gauge includes a head 10, a handle 20 and a mouth 30. On the head 10 is installed a display 11 for showing the value of the pressure in a tire connected with the pressure gauge. In the mouth 30 is installed a wheel 40. On the mouth 30 is installed a switch 41 connected with the wheel 40. Through operating the switch 41, the mouth 30 is turned between a mode for receiving an American valve AV and another mode for receiving a French valve FV. This pressure gauge can be switched between two modes for connection with two different valves. However, it can only be used to measure the pressure in the tire. To pump the tire, the pressure gauge is removed from the valve of the tire before an air compressor or pump is connected with the valve of the tire. The pressure gauge and the air compressor or pump must be connected with and removed from the valve alternately several times before a desired value of the pressure is reached in the tire. This operation troubles a user and takes a lot of time.

Referring to FIG. 12, a pumping joint 90 is provided between an air compressor for cars and the valve of a tire of a car. The pumping joint 90 includes a gun 91. The gun 91 is connected with the air compressor at an end and connected with a pressure gauge 93 at another end. The pressure gauge 93 is further connected with a flexible pipe 92. The flexible pipe 92 is connected with a nozzle 94. The nozzle 94 can be connected with the valve. However, the pumping joint 90 can only be connected with an air compressor and cannot be connected with a pump. Moreover, the pressure gauge 93 does not work alone. The adaptability of the pumping joint 90 is limited. A user cannot carry the pumping joint 90 with him or her.

The present invention is intended to obviate or at least alleviate the problems encountered in the prior art.

SUMMARY OF INVENTION

According to the present invention, a piping and pressure-measuring apparatus includes a pipe defining a first chamber, a second chamber and a third chamber between the first and second chambers. A first connector includes a section put in the first chamber and an opposite section for connection with a pump. A check valve is installed in the first connector. A second connector includes a first element put in the second chamber and a second element connected with the first element for connection with an inflatable object. A pressure gauge is connected with the third chamber.

An advantage of the piping and pressure-measuring apparatus of the present invention is that it can be used as a stand-alone pressure gauge for the inflatable object, and its operation thereof is simple and easy.

Another advantage of the piping and pressure-measuring apparatus of the present invention is that if the pressure in the inflatable object is too low, it can further be connected with the pump so that pumping and pressure measurement can be conducted at the same time, and the operation thereof is simple, easy and not troublesome.

Other advantages and novel features of the invention will become more apparent from the following detailed description in conjunction with the attached drawings.

BRIEF DESCRIPTION OF DRAWINGS

The present invention will be described through detailed illustration of embodiments referring to the drawings.

DETAILED DESCRIPTION OF EMBODIMENTS

Figure 1:
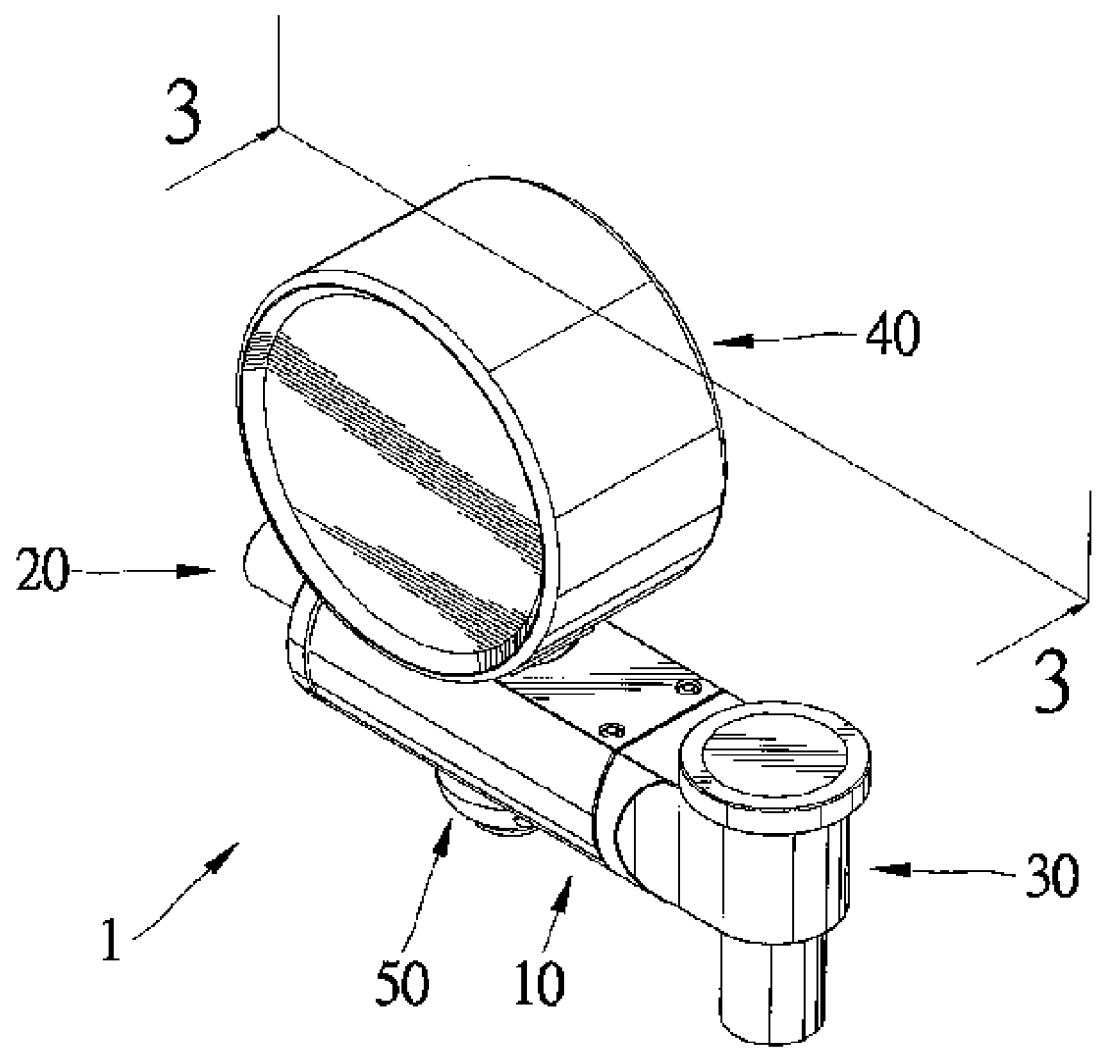
FIG. 1 is a perspective view of a piping and pressure-measuring apparatus for use with pumps according to a first embodiment of the present invention.
Figure 2:
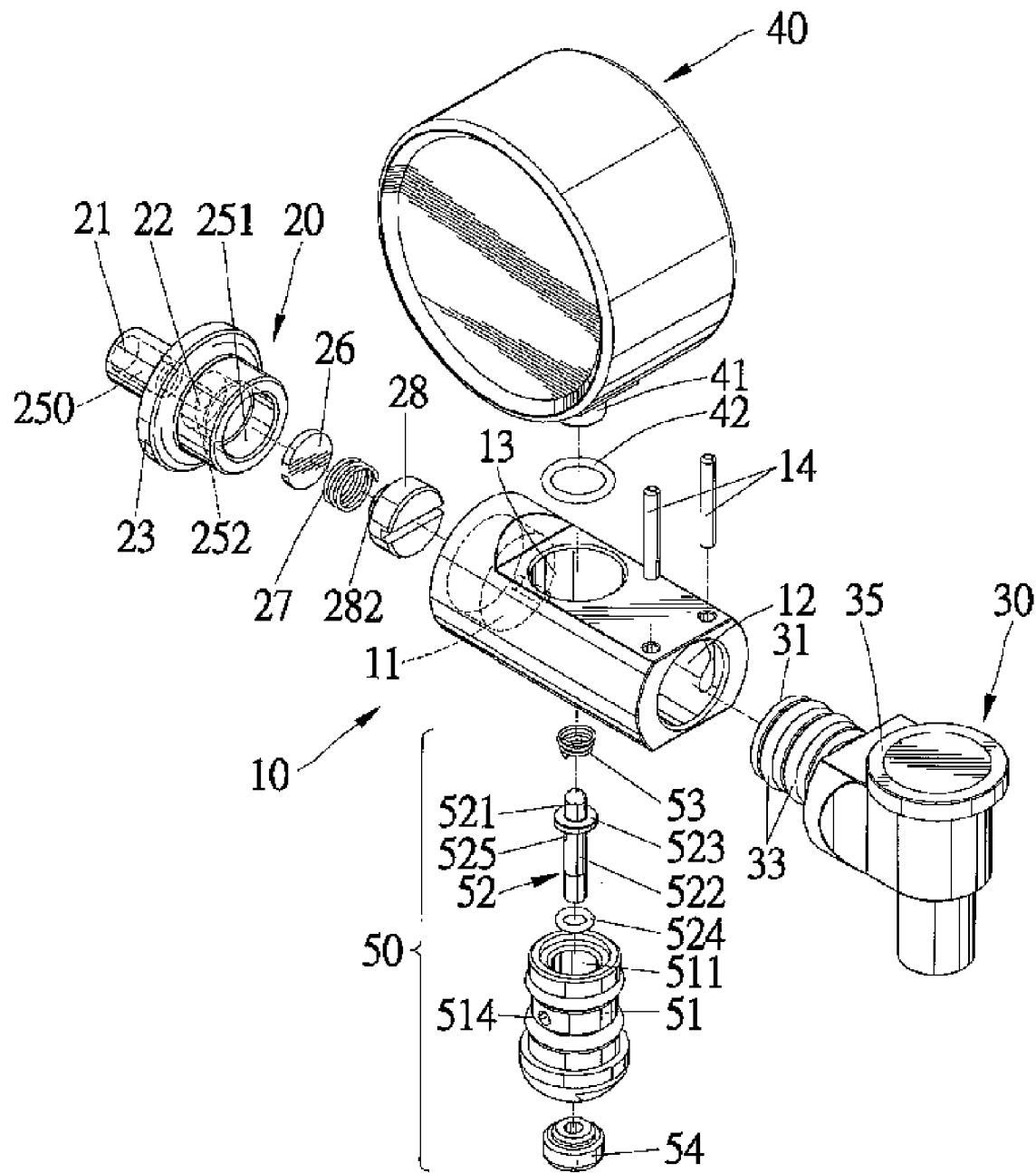
FIG. 2 is an exploded view of the piping and pressure-measuring apparatus shown in FIG. 1.
Figure 3:
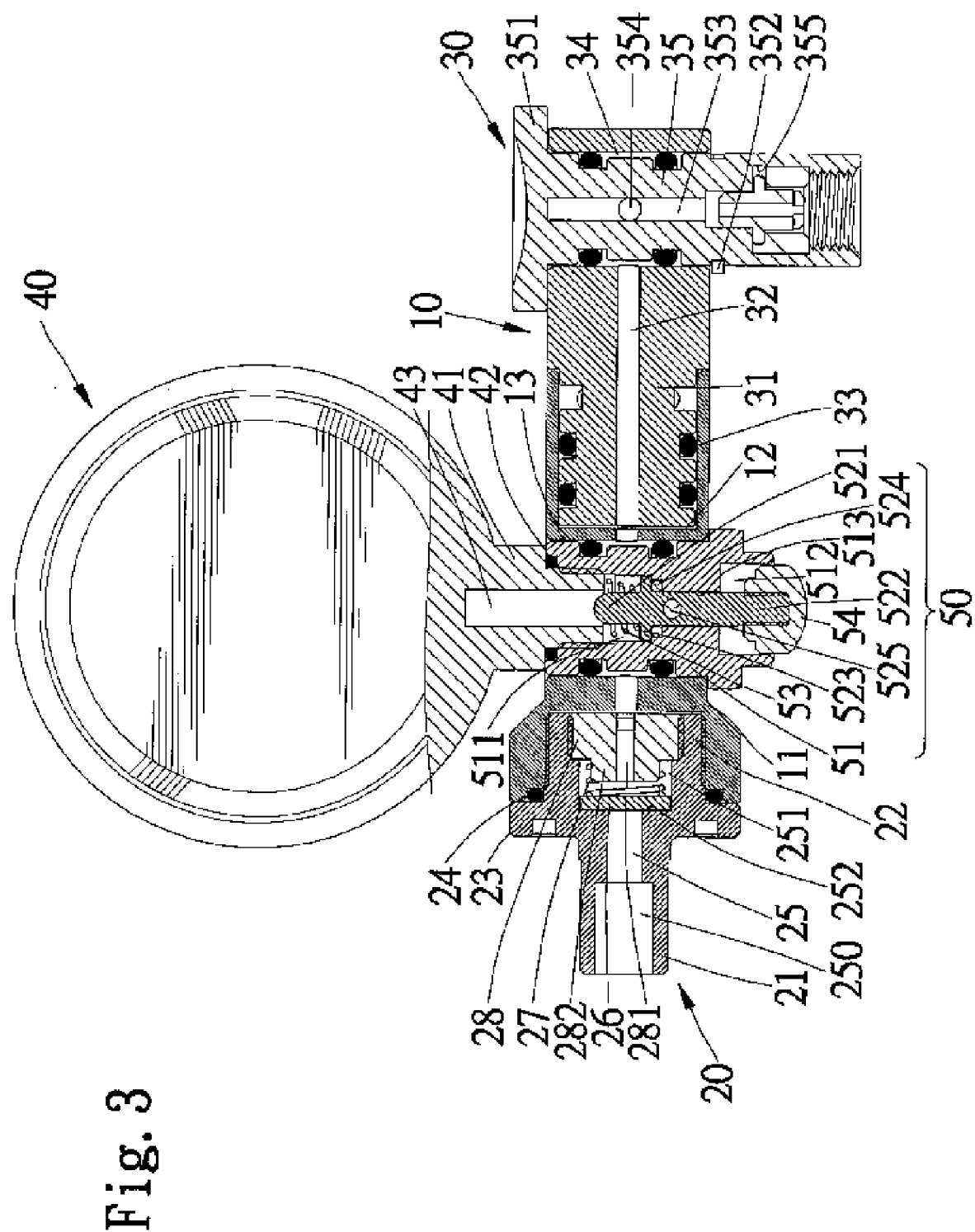
FIG. 3 is a cross-sectional view taken along a line 3—3 in FIG. 1.

Referring to FIGS. 1 through 3, according to a first embodiment of the present invention, a piping and pressure-measuring apparatus 1 includes a pipe 10, a first connector 20, a second connector 30, a pressure gauge 40 and a release device 50. The first connector 20 is provided at an end of the pipe 10 for connection with pumps. The second connector 30 is provided at an opposite end of the pipe 10 for connection with pneumatic cushions, tires or the like. The pressure gauge 40 is provided between the ends of the pipe 10 for measuring the pressure in such pneumatic cushions, tires or the like. The release device 50 is connected with the pressure gauge 40 for releasing air from such pneumatic cushions, tires or the like through the pressure gauge 40.

The pipe 10 defines a first chamber 11, a second chamber 12 and a third chamber 13. The first chamber 11 is communicated with the second chamber 12 through the third chamber 13. The axis of the first chamber 11 is aligned with the axis of the second chamber 12. The axes of the first and second chambers 11 and 12 are perpendicular to the axis of the third chamber 13.

The first connector 20 is inserted in the first chamber 11. The first connector 20 includes a first section 21 and a second section 22 opposite to the first section 21. A flange 23 is formed between the first and second sections 21 and 22 of the first connector 20. The first section 21 of the first connector 20 can be inserted in a proper element of a pump. The second section 22 of the first connector 20 is inserted in the first chamber 11, and the flange 23 is put against the pipe 10. A seal 24 is provided between the second section 22 of the first connector 20 and the wall of the first chamber 11 of the pipe 10 for blocking leakage of air from the first chamber 11 of the pipe 10.

The first connector 20 defines a passage 25. The passage 25 includes a first portion 250 in the first section 21 of the first connector 20 and a second portion 251 in the second section 22 of the first connector 20. Between the first and second portions 250 and 251 of the passage 25 is formed a shoulder 252.

A valve 26, a spring 27 and a restraint 28 are put in the second portion 251 of the passage 25. The restraint 28 is engaged with the second section 22 of the first connector 20 in order to keep the valve 26 and the spring 27 in the second portion 251 of the passage 25. The restraint 28 defines a passage 281 through which air can flow. The restraint 28 includes a reduced portion 282 inserted in the spring 27. The spring 27 is compressed between the restraint 28 and the valve 26. The valve 26 is put against the shoulder 252 unless it is pushed because of pressurized air from a pump. In other words, the valve 26, the spring 27 and the restraint 28 constitute a check valve.

The second connector 30 includes a first member 31 and a second member 35. The first member 31 of the second connector 30 defines a passage 32 and a chamber 34 communicated with the passage 32. The axis of the passage 32 is perpendicular to the axis of the chamber 34. A section of the first member 31 of the second connector 30 is inserted in the second chamber 12 of the pipe 10. A plurality of seals 33 is provided between the section of the passage 32 and the wall of the second chamber 12 of the pipe 10 for preventing leakage of air from the second chamber 12 of the pipe 10. Two pins 14 are used to keep the first element 31 of the second connector 30 connected with the pipe 10.

The second element 35 of the second connector 30 is inserted through the chamber 35 and kept in position because of a flange 351 formed thereon and a C-clip 352 installed thereon. The second element 35 of the second connector 30 defines a passage 353, an aperture 354 communicated with the passage 353 and a chamber 355 communicated with the passage 353. The aperture 354 is communicated with the chamber 34. The chamber 355 can receive a valve of a pneumatic cushion, a tire or the like.

The pressure gauge 40 includes a tube 41 defining a passage 43. A seal 42 is installed on the tube 41. The tube 41 is inserted in the third chamber 13 of the pipe 10. The pressure gauge 40 is conventional and the structure and functions thereof will not be described in detail.

The release device 50 is connected with the pressure gauge 40. The release device 50 includes a socket 51, a valve 52, a spring 53 and a button 54.

The socket 51 is inserted in the third chamber 13 of the pipe 10. The socket 51 defines a chamber 511 for receiving the tube 41, a chamber 512 for receiving the button 54, a passage 513 through which the chamber 511 is communicated with chamber 512 and an aperture 514 communicated with the passage 513.

The valve 52 includes a first section 521, a second section 522, a flange 523 formed between the first and second sections 521 and 522 and an aperture 525 defined in the second section 522. A seal 524 is installed on the second section 522 of the valve 52. The first section 521 and flange 523 of the valve 52 and the seal 524 are put in the chamber 511. A spring 53 is compressed between the tube 41 and the flange 523 in order to force the flange 523 and the seal 524 to block the communication between the chamber 511 and the passage 513. The second section 522 of the valve 52 is inserted through the chamber 512. The button 54 is secured to the second section 522 of the valve 52. The button 54 can be pressed in order to allow the communication between the chambers 511 and 512 through the passage 513. The release device 50 is conventional and the structure and functions thereof will not be described in detail.

Figure 4:
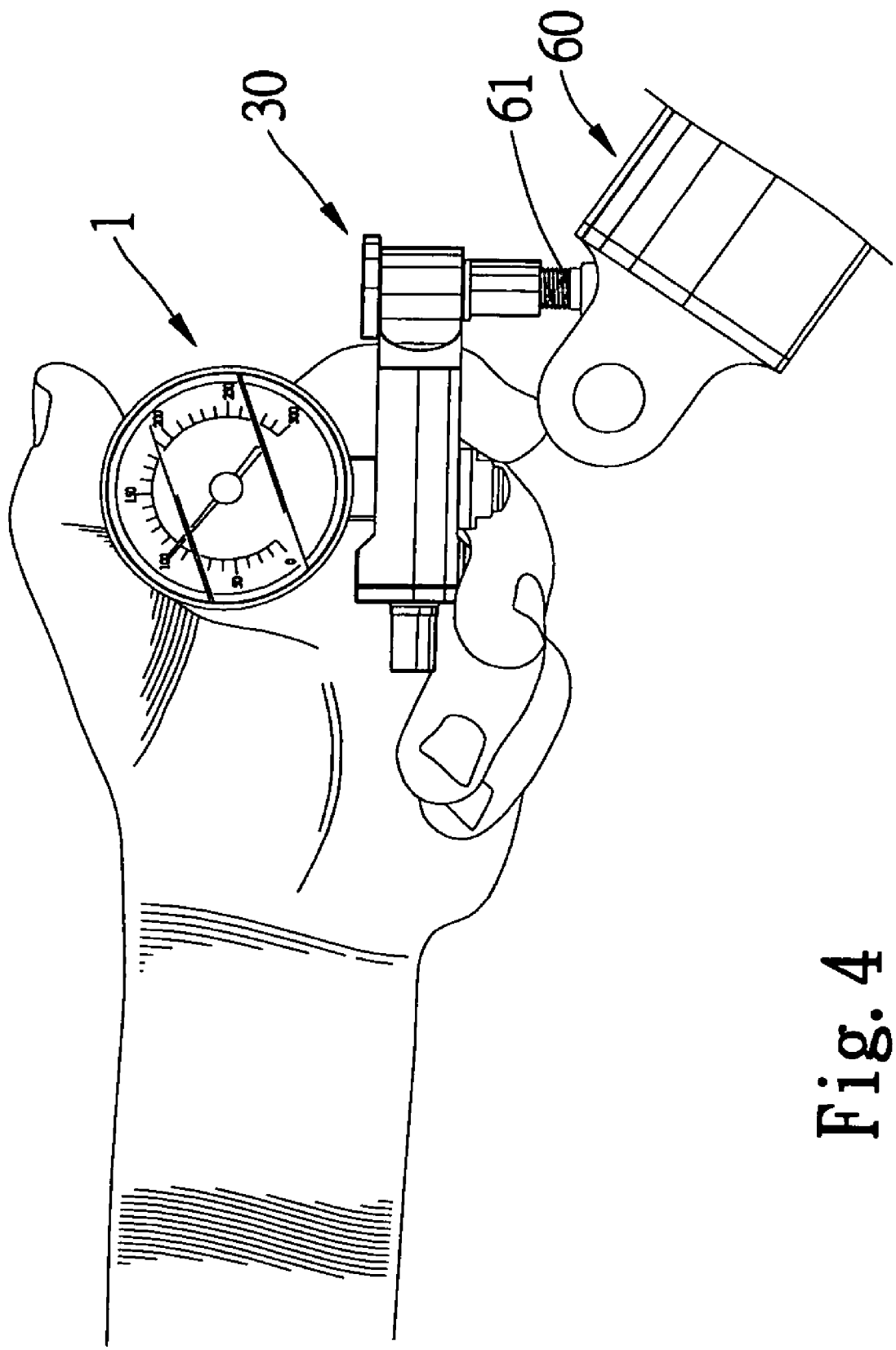
FIG. 4 is a side view of the piping and pressure-measuring apparatus shown in FIG. 1 used as a stand-alone pressure gauge for measuring the pressure in a pneumatic cushion.

Referring to FIG. 4, the piping and pressure-measuring apparatus 1 is used as a stand-alone pressure gauge. A user operates the piping and pressure-measuring apparatus 1 well with only one hand. The second connector 30 is connected with a valve 61 of a pneumatic cushion 60 in order to measure the pressure in the pneumatic cushion 60.

If the pressure in the pneumatic cushion 60 is too high, air can be released from the pneumatic cushion 60 through the release device 50.

Figure 5:
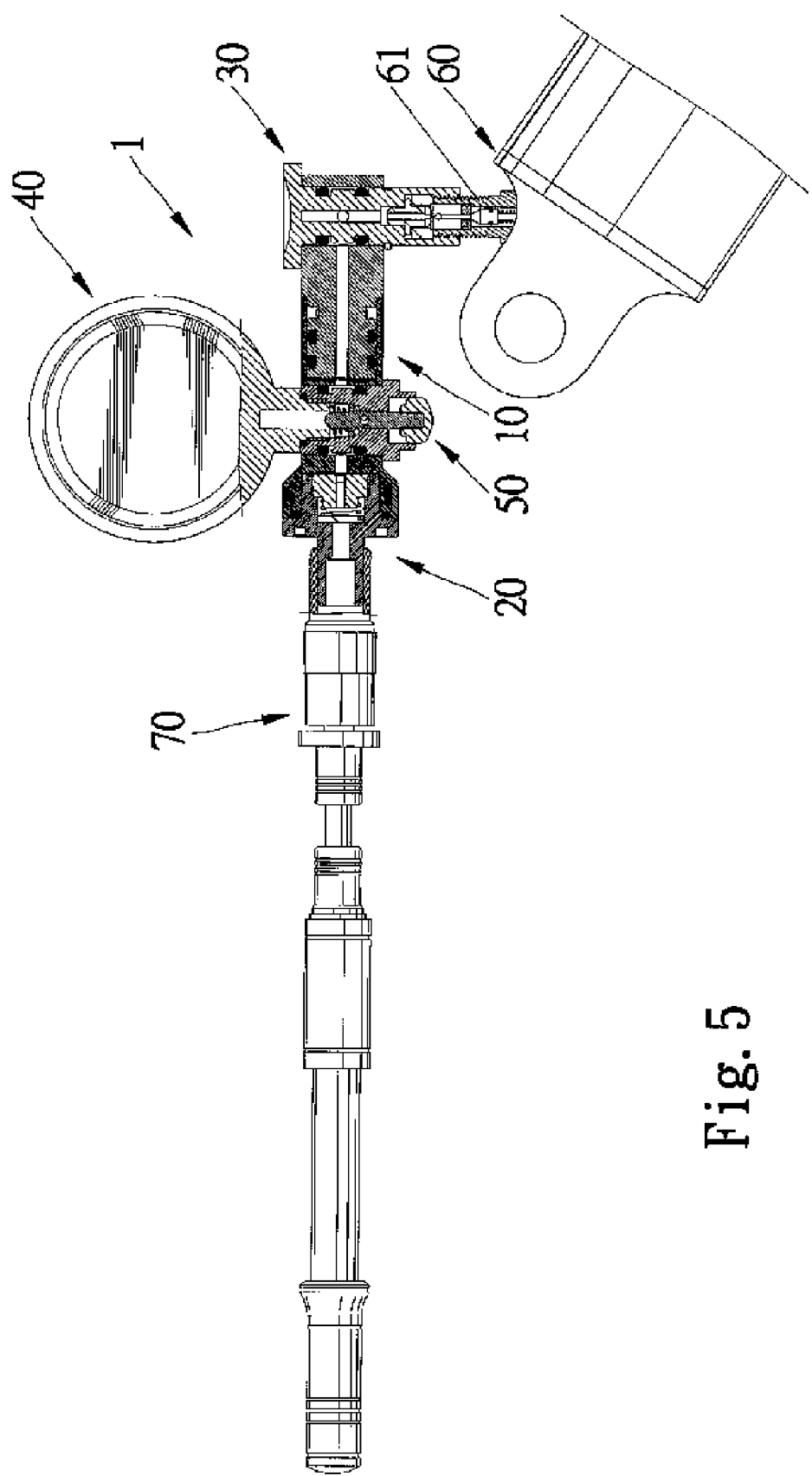
FIG. 5 is a side view of the piping and pressure-measuring apparatus shown in FIG. 1 provided between a pneumatic cushion and a pump.

Referring to FIG. 5, if the pressure in the pneumatic cushion 60 is too low, the first connector 20 is connected with the pump 70. The user can operate the pump 70 to pump air into the pneumatic cushion 60 through the piping and pressure-measuring apparatus 1. In the piping and pressure-measuring apparatus 1, the pumped air goes through the first connector 20, the pipe 10 and the second connector 30.

Figure 6:
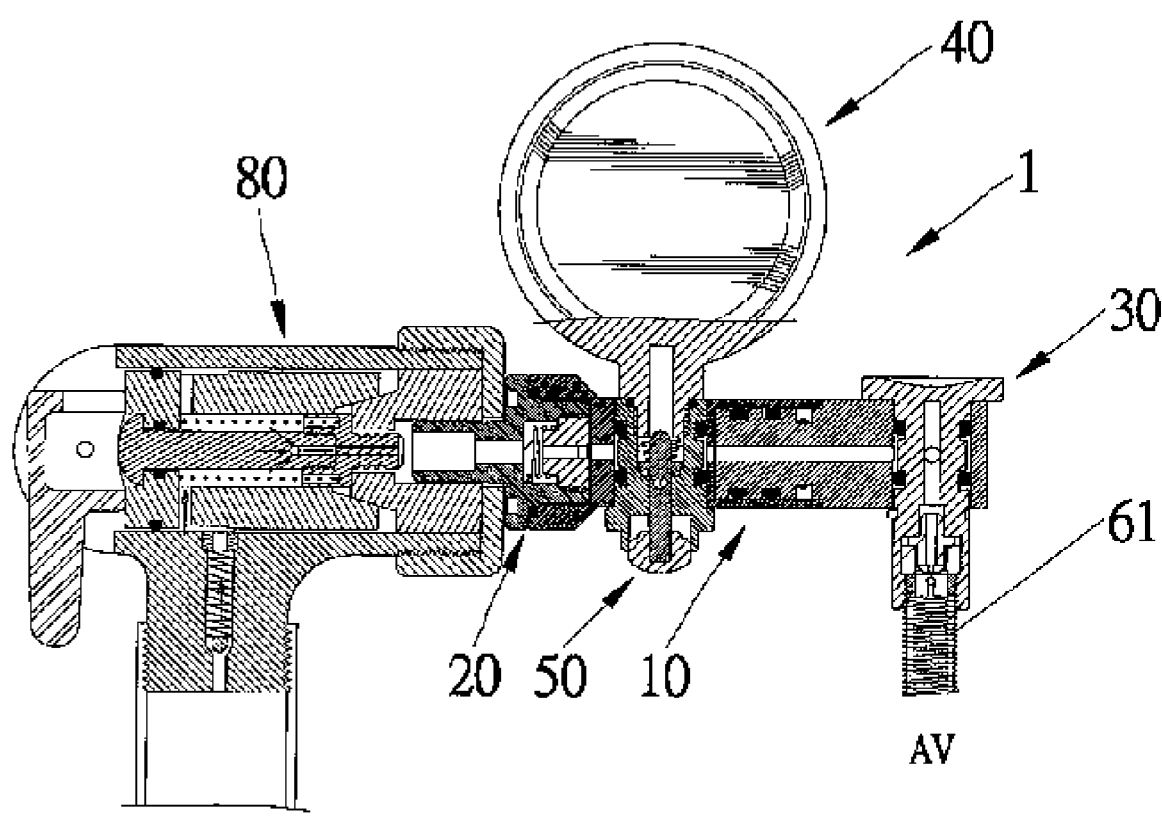
FIG. 6 is a side view of the piping and pressure-measuring apparatus shown in FIG. 1 connected with another pump.

Referring to FIG. 6, the piping and pressure-measuring apparatus 1 is connected with another pump 80. As mentioned above, the first connector 20 is connected with the pump 80. The user can operate the pump 80 to pump air into the valve 61 of the pneumatic cushion 60 through the piping and pressure-measuring apparatus 1.

Figure 7:
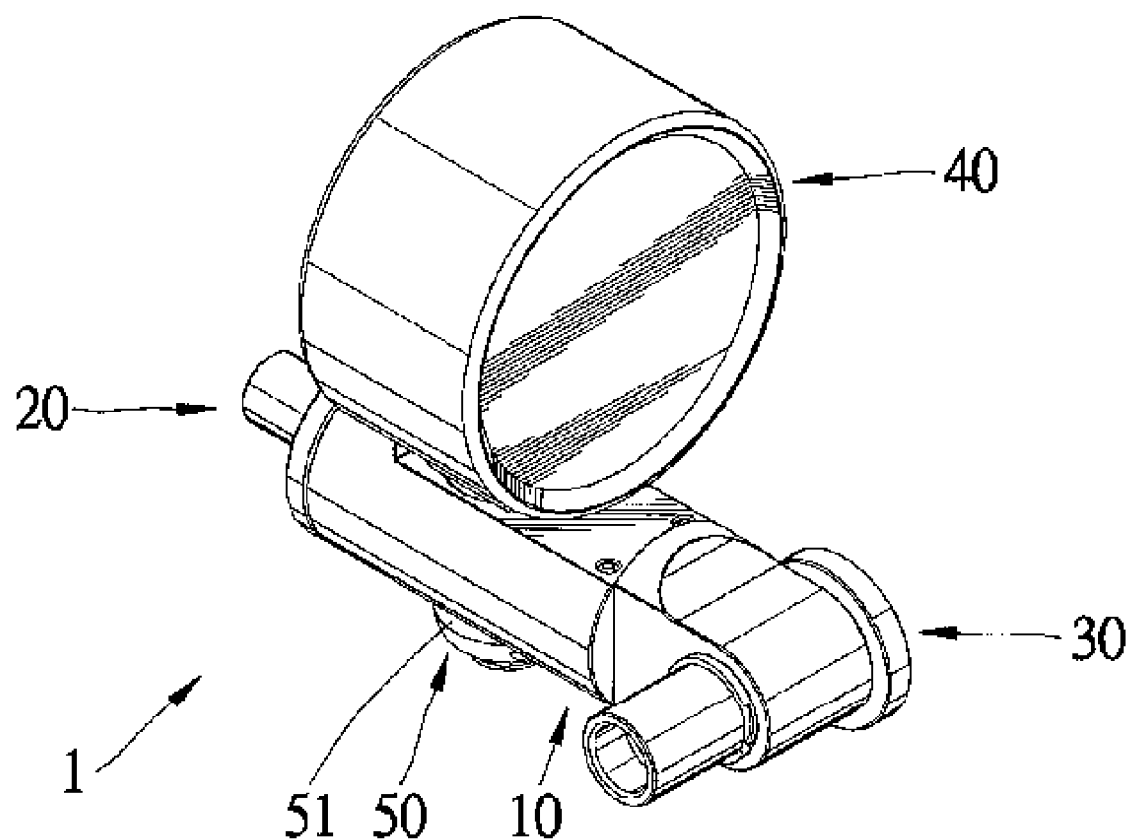
FIG. 7 is similar to FIG. 1 but shows a pressure gauge in a different position on a pipe.
Figure 8:
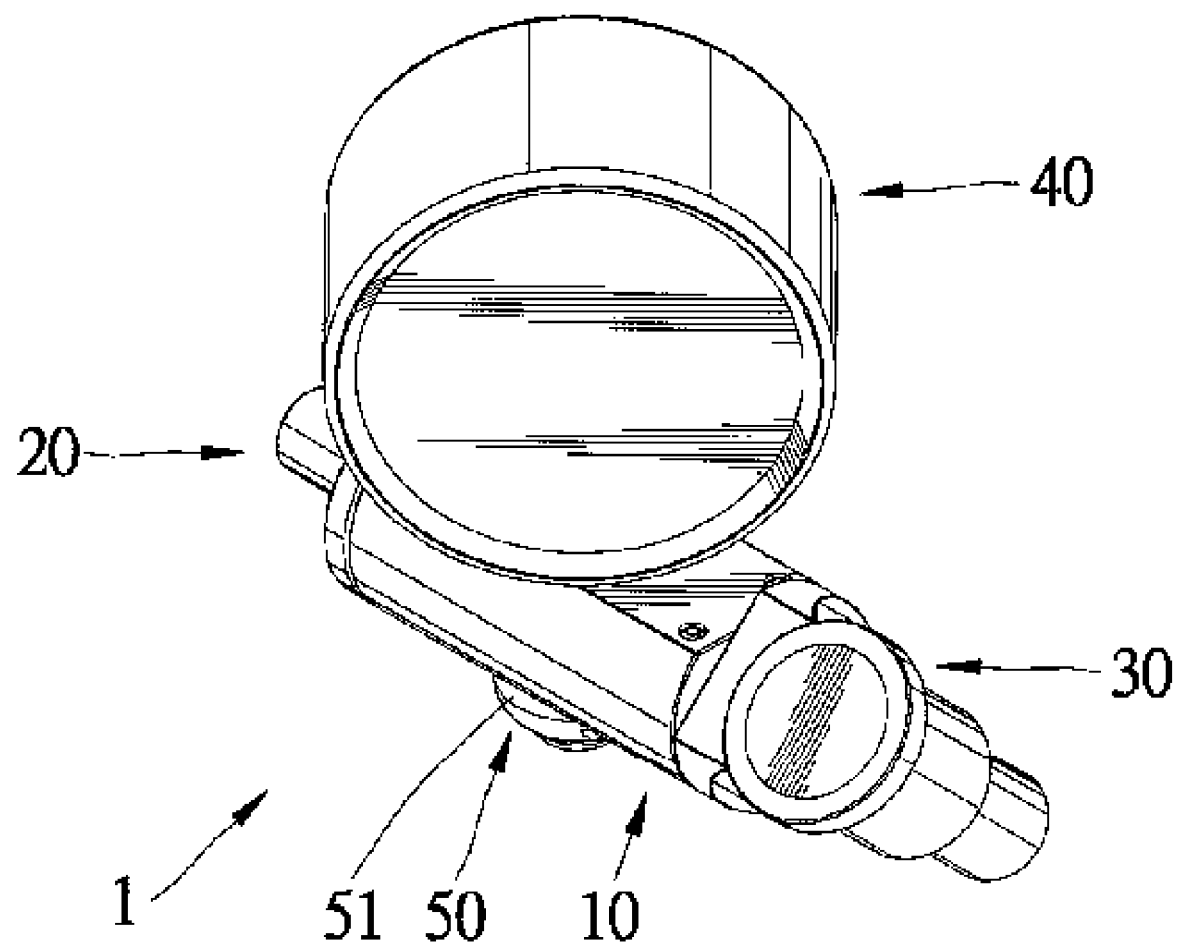
FIG. 8 is similar to FIG. 7 but shows the pressure gauge in a different position on the pipe.

Referring to FIGS. 7 and 8, as the second connector 30 is connected with the pipe 10 by inserting the cylindrical first element 31 thereof in the second chamber 12, the second connector 30 can be put in various positions on the pipe 10. Similarly, as the pressure gauge 40 is connected with the pipe 10 by inserting the tube 41 in the third chamber 13, the pressure gauge 40 can be put in various positions on the pipe 10. Thus, based on various working environments, the shape of the piping and pressure-measuring apparatus 1 can be changed.

Figure 9:
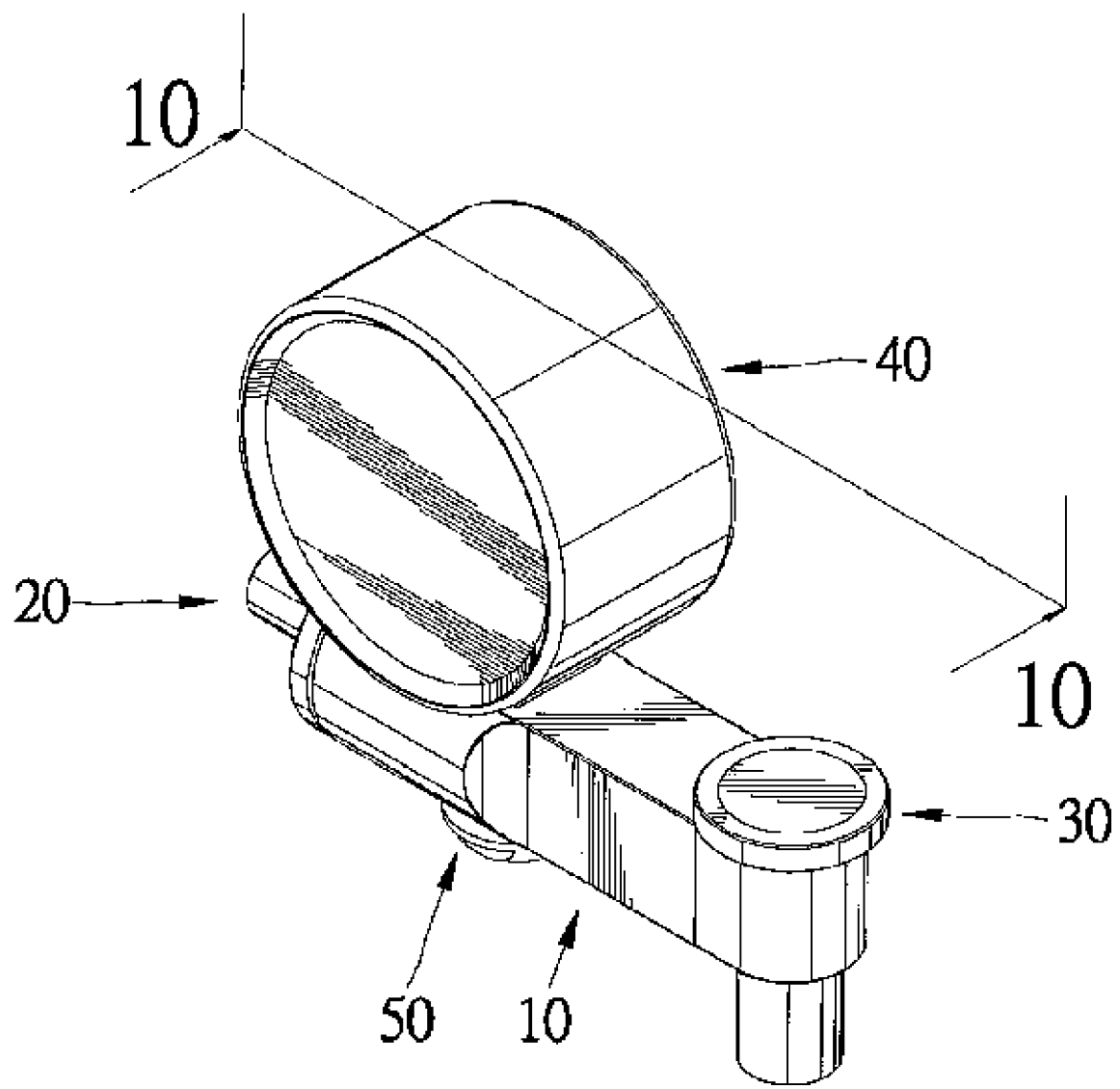
FIG. 9 is a perspective view of a piping and pressure-measuring apparatus for use with pumps according to a second embodiment of the present invention.
Figure 10:
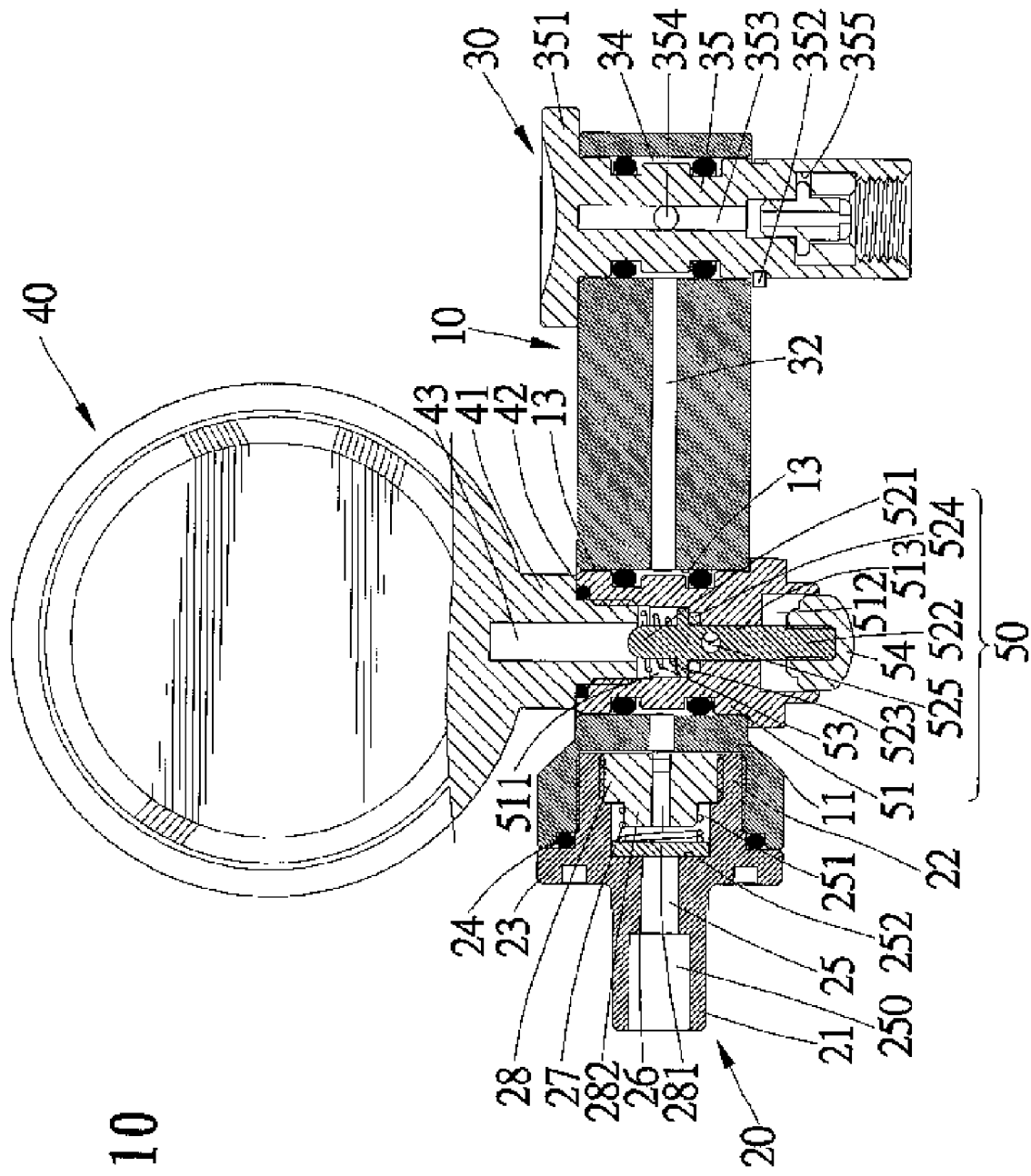
FIG. 10 is a cross-sectional view taken along a line 10—10 in FIG. 9.

FIGS. 9 and 10 show a piping and pressure-measuring apparatus 1 for use with pumps according to a second embodiment of the present invention. The second embodiment is similar to the first embodiment except for merging the second section 22 of the pipe 10 with the first member 31 of the second connector 30. The seals 33 are saved accordingly. Although only the pressure gauge 40 can be rotated on the pipe 10, the shape of the piping and pressure-measuring apparatus 1 can still be changed based on various working environments.

Figure 11:
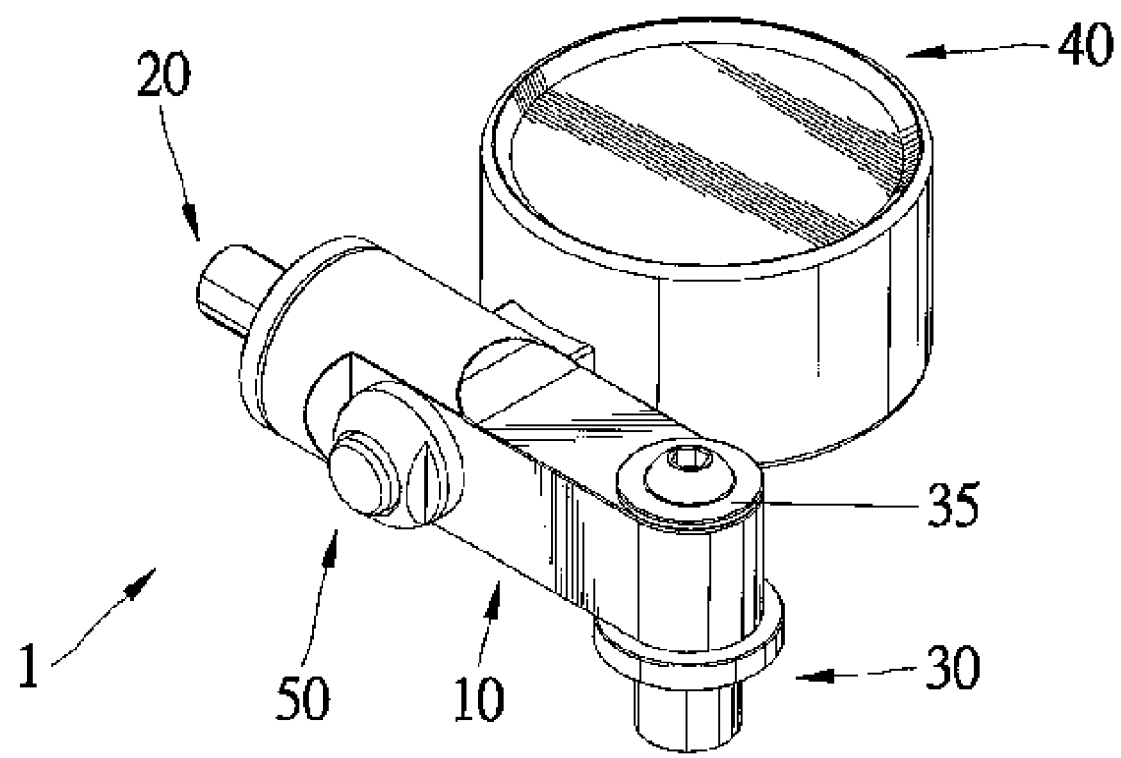
FIG. 11 is a perspective view of a piping and pressure-measuring apparatus for use with pumps according to a third embodiment of the present invention.
Figure 12:
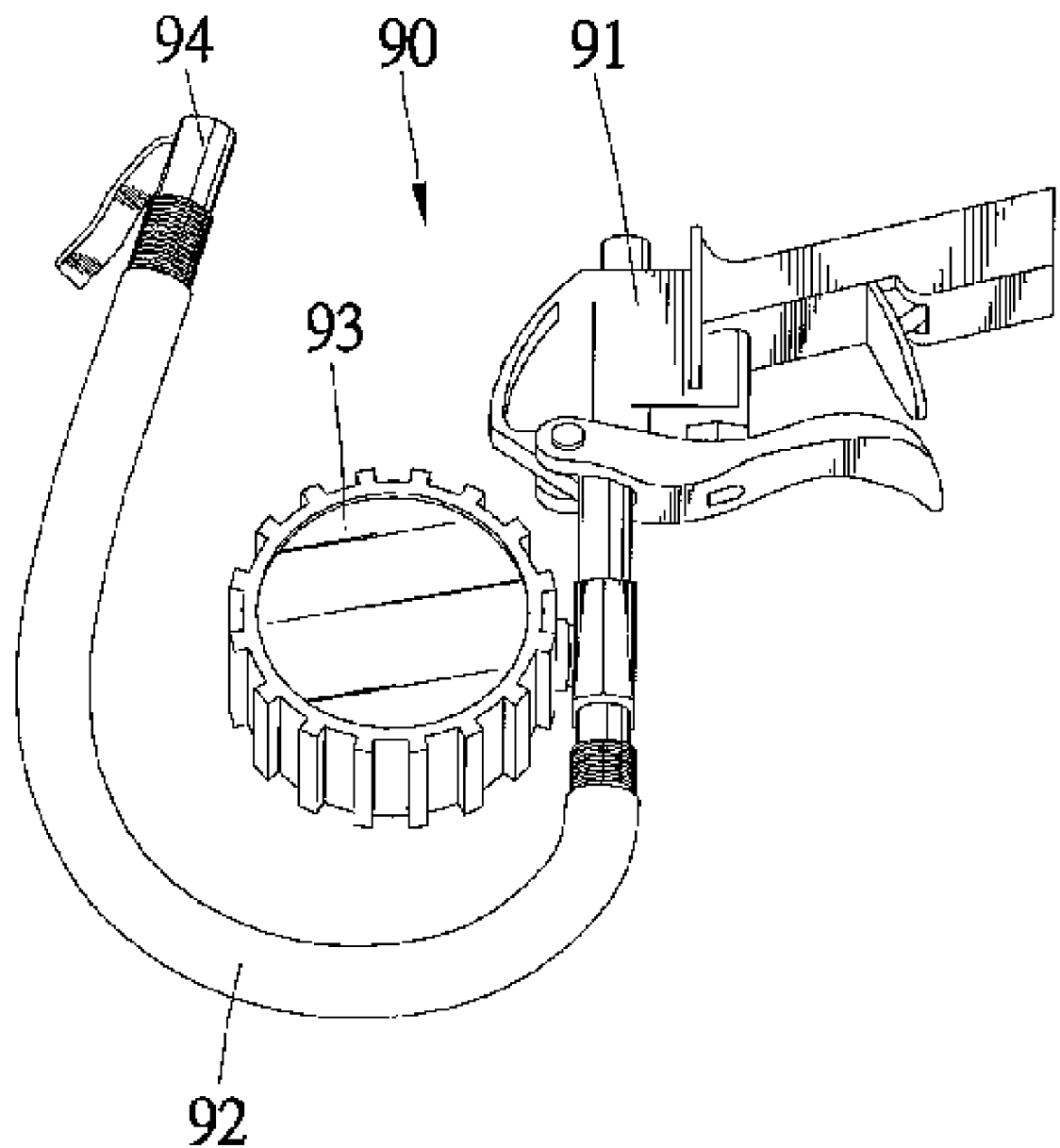
FIG. 12 is a perspective view of a conventional piping and pressure-measuring apparatus for use with air compressors.

FIG. 11 shows a piping and pressure-measuring apparatus 1 for use with pumps according to a third embodiment of the present invention. The third embodiment is similar to the second embodiment except that the second connector 30 is connected with the pipe 10 at a different angle.

The piping and pressure-measuring apparatus 1 includes several advantageous features. Firstly, it can be used as a stand-alone pressure gauge for an inflatable object, and its operation thereof is simple and easy. Secondly, if the pressure in the inflatable object is too high, it can be used to release air from the inflatable object. Thirdly, if the pressure in the inflatable object is too low, it can further be connected with a pump so that pumping and pressure measurement can be conducted at the same time, and the operation thereof is simple, easy and not troublesome. Fourthly, based on various working environments, the shape of the piping and pressure-measuring apparatus 1 can be changed.

The present invention has been described through detailed illustration of some embodiments. Those skilled in the art can derive variations from the embodiments without departing from the scope of the present invention. Therefore, the embodiments shall not limit the scope of the present invention defined in the claims.

What is claimed is:

1. A piping and pressure-measuring apparatus comprising:
a pipe defining a first chamber, a second chamber, and a third chamber intermediate and separating the first and second chambers, with the first chamber being in communication with the third chamber, with the second chamber being in communication with the third chamber, with the first chamber being in communication with the second chamber only through the third chamber;
a first connector comprising a section put in the first chamber and an opposite section for connection with a pump;
a check valve installed in the first connector;
a second connector comprising a first element put in the second chamber and a second element connected with the first element for connection with an inflatable object;
a pressure gauge inserted into the third chamber; and
a release device connected with the pressure gauge and inserted into the third chamber, with the release valve being selectively in communication outside the third chamber and the pipe.

2. The piping and pressure-measuring apparatus according to claim 1 wherein the first connector comprises a flange formed between the sections for abutting the pipe.

3. The piping and pressure-measuring apparatus according to claim 2 wherein the first connector defines a passage for receiving the check valve.

4. The piping and pressure-measuring apparatus according to claim 1 wherein the first section of the first element is merged with the pipe.

5. The piping and pressure-measuring apparatus according to claim 1 wherein the first element defines a passage communicated with the second chamber and an element chamber communicated with the passage for receiving the second element.

6. The piping and pressure-measuring apparatus according to claim 5 wherein the second element defines a passage, an aperture through which the passage of the second element is communicated with the element chamber of the first element, and an inflation chamber communicated with the passage of the second element for receiving a portion of the inflatable object.

7. The piping and pressure-measuring apparatus according to claim 1 wherein the second element comprises a flange formed thereon and a C-clip installed thereon for keeping the second element connected with first element.

8. The piping and pressure-measuring apparatus according to claim 1 wherein the pressure gauge comprises a tube inserted in the third chamber.

9. The piping and pressure-measuring apparatus according to claim 8 wherein the tube is inserted the third chamber rotationally.

10. A piping and pressure-measuring apparatus comprising:
a pipe defining a first chamber, a second chamber, and a third chamber between the first and second chambers;
a first connector comprising a section received in the first chamber and an opposite section for connection with a pump, wherein the first connector defines a passage comprising a first portion for receiving a portion of the pump, a second portion communicated with the first portion and a shoulder formed between the first portion and the second portions;
a check valve installed in the second portion of the passage of the first connector, with the check valve abutting with the shoulder for blocking the first portion from the second portion of the passage;
a second connector comprising a first element put in the second chamber and a second element connected with the first element and for connection with an inflatable object; and
a pressure gauge connected with the third chamber.

11. The piping and pressure-measuring apparatus according to claim 10 wherein the check valve comprises a valve for abutting the shoulder, a spring for biasing the valve, and a restraint for keeping the valve and the spring in the second portion of the passage.

12. The piping and pressure-measuring apparatus according to claim 11 wherein the restraint defines a passage for air.

13. The piping and pressure-measuring apparatus according to claim 11 wherein the restraint comprises a reduced portion inserted in the spring.

14. The piping and pressure-measuring apparatus according to claim 10 comprising a release device connected with the pressure gauge.

15. The piping and pressure-measuring apparatus according to claim 10 wherein the first connector comprises a flange formed between the sections for abutting the pipe.

16. The piping and pressure-measuring apparatus according to claim 10 wherein the second element includes an inflation chamber for receiving a valve of the inflatable object.

17. A piping and pressure-measuring apparatus comprising:
a pipe defining a first chamber, a second chamber, and a third chamber intermediate and separating the first and second chambers, with the first chamber being in communication with the third chamber, with the second chamber being in communication with the third chamber, with the first chamber being in communication with the second chamber only through the third chamber;
a first connector comprising a section put in the first chamber and an opposite section for connection with a pump;
a check valve installed in the first connector;
a second connector comprising a first element put in the second chamber and a second element connected with the first element for connection with an inflatable object; and
a pressure gauge inserted into the third chamber, wherein the first element comprises a first section inserted in the second chamber and a second section connected with the second element.

18. The piping and pressure-measuring apparatus according to claim 17 wherein the first section of the first element is removably inserted in the second chamber at different rotational positions.

* * * * *